(12) United States Patent
Kishimoto

(10) Patent No.: US 8,325,396 B2
(45) Date of Patent: Dec. 4, 2012

(54) COLOR MANAGEMENT APPARATUS, COLOR MANAGEMENT METHOD AND COMPUTER READABLE MEDIUM RECORDING COLOR MANAGEMENT PROGRAM

(75) Inventor: Yasunari Kishimoto, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 877 days.

(21) Appl. No.: 12/463,819

(22) Filed: May 11, 2009

(65) Prior Publication Data

US 2009/0284774 A1 Nov. 19, 2009

(30) Foreign Application Priority Data

May 14, 2008 (JP) ................................. 2008-127174

(51) Int. Cl.
*H04N 1/60* (2006.01)
*G03F 3/08* (2006.01)
(52) U.S. Cl. .......................... 358/518; 358/1.9; 358/520
(58) Field of Classification Search ................... 358/1.9, 358/2.1, 518, 520; 382/162, 167; 345/589, 345/591, 601
See application file for complete search history.

(56) References Cited

U.S. PATENT DOCUMENTS

| | | | |
|---|---|---|---|
| 6,100,999 A | 8/2000 | Ikegami | |
| 6,559,982 B1 * | 5/2003 | Gondek | 358/518 |
| 6,567,543 B1 * | 5/2003 | Shiraiwa et al. | 382/167 |
| 7,274,487 B2 * | 9/2007 | Fukasawa | 358/1.9 |
| 7,277,200 B2 * | 10/2007 | Ohga | 358/1.9 |
| 7,310,167 B2 * | 12/2007 | Shirasawa | 358/1.9 |
| 7,692,666 B1 * | 4/2010 | Bourgoin et al. | 345/601 |
| 2001/0019427 A1 * | 9/2001 | Komatsu | 358/1.18 |
| 2002/0057434 A1 * | 5/2002 | Ohga | 356/406 |
| 2003/0035157 A1 | 2/2003 | Kanai | |
| 2003/0184557 A1 * | 10/2003 | Wen | 345/590 |
| 2003/0184779 A1 * | 10/2003 | Ohga | 358/1.9 |
| 2004/0218811 A1 * | 11/2004 | Edge et al. | 382/162 |
| 2005/0249407 A1 * | 11/2005 | Tin | 382/167 |
| 2007/0030499 A1 * | 2/2007 | Hori | 358/1.9 |
| 2007/0086026 A1 * | 4/2007 | Huang et al. | 358/1.9 |
| 2007/0285378 A1 * | 12/2007 | Lankhorst et al. | 345/102 |
| 2008/0012875 A1 * | 1/2008 | Newman | 345/589 |

(Continued)

FOREIGN PATENT DOCUMENTS

JP A-10-44510 2/1998

(Continued)

OTHER PUBLICATIONS

Japanese Office Action issued in Japanese Patent Application No. 2008-127174 on May 11, 2010 (with translation).

(Continued)

*Primary Examiner* — Kimberly A Williams
(74) *Attorney, Agent, or Firm* — Oliff & Berridge, PLC

(57) ABSTRACT

In color management apparatus, the generation unit uses the color prediction model, the data of an input color expressed by the device dependent color and data of an output color expressed by the device independent color to generate color profile between the input color and the output color. The obtaining unit obtains a target lightness of the white point which is less than the standardized maximum lightness in the device independent color space. The change unit changes the output color into the device independent color of which the target lightness of the white point is a maximum lightness.

20 Claims, 6 Drawing Sheets

U.S. PATENT DOCUMENTS

| | | | |
|---|---|---|---|
| 2008/0239355 A1* | 10/2008 | Goto et al. | 358/1.9 |
| 2008/0239410 A1* | 10/2008 | Hashii et al. | 358/462 |
| 2008/0297456 A1* | 12/2008 | Marcu et al. | 345/88 |
| 2012/0013923 A1* | 1/2012 | Sakurai | 358/1.9 |
| 2012/0019881 A1* | 1/2012 | Lammens et al. | 358/530 |

FOREIGN PATENT DOCUMENTS

| | | |
|---|---|---|
| JP | A-2002-94811 | 3/2002 |
| JP | A-2005-64841 | 3/2005 |
| JP | A-2005-79620 | 3/2005 |
| JP | A-2006-238335 | 9/2006 |
| JP | A-2006-279091 | 10/2006 |
| JP | B2-3841151 | 11/2006 |
| JP | A-2007-288489 | 11/2007 |

OTHER PUBLICATIONS

Specification ICC.1:2004-10 (Profile version 4.2.0.0). *Image Technology Colour Management—Architecture, Profile Format, and Data Structure*, Revision of ICC.1:2003-09, May 22, 2006.

* cited by examiner

COLOR MANAGEMENT APPARATUS, COLOR MANAGEMENT METHOD AND COMPUTER READABLE MEDIUM RECORDING COLOR MANAGEMENT PROGRAM

CROSS-REFERENCE TO RELATED APPLICATIONS

This application is based on and claims priority under 35 USC 119 from Japanese Patent Application No. 2008-127174 filed May 14, 2008.

BACKGROUND

1. Technical Field

The present invention relates to a color management apparatus, a color management method and a computer readable medium storing a program thereof. Particularly, the present invention relates to a color management apparatus which generates, using a color prediction model, a color profile for a conversion between an input color and an output color, from data of the input color, which is input to a device, the input color being expressed by a device dependent color, and the output color, which is output from a device, the output color being expressed by a device independent color, a color management method applicable to the color management apparatus, and a computer readable medium storing a program thereof.

2. Related Art

Input devices and output devices such as a scanner, a display, a color printer and the like connected to a computer have mutually different color characteristics such as color gamuts. In order to pass colors between the devices, a color conversion is performed in accordance with profiles prepared for the respective devices based on the color characteristics of each device, so that the differences in color characteristics of the devices can be corrected and a user-desired color reproduced. A color profile for performing a color conversion between a device dependent color, and a device independent color, is commonly utilized. A profile is commonly generated by a method using a color prediction model, in which a data set (characterizations data), which represents the correspondence between a device dependent color and a device independent color with respect to a part of colors in a color space, is input to a color prediction model (also referred to as a "device model" or "color characterization") to perform an estimation operation of relationships between a first color in a first color space and a second color in a second color space in accordance with a given algorithm.

SUMMARY

In consideration of the above circumstances, the present invention provides a color management apparatus, a color management method and a recoding medium recording color management program.

According to an aspect of the invention, there is provided a color management apparatus including: a generation unit that generates a color profile between an input color which is input into a device and an output color which is output from the device, using a color prediction model, data of the input color expressed by a device dependent color, and data of the output color expressed by a device independent color; an obtaining unit that obtains a target lightness of a white point which is less than a standard maximum lightness in the device independent color space; and a change unit that changes the output color to a device independent color having a maximum lightness of the device independent color space being set to the target lightness of the white point obtained by the obtaining unit.

BRIEF DESCRIPTION OF THE DRAWINGS

Exemplary embodiments of the present invention will be described in detail based on the following figures, wherein.

DETAILED DESCRIPTION

With reference to the drawings, exemplary embodiments of the preset invention are described below. In the following embodiment, the present invention is applied to a Profile type (generation of a color profile (coefficients) in a color signal which is output from a certain first device (an input device) to a certain second device (an output device)). However, the exemplary embodiments may be applicable to a Printer Profile type (generation of a color profile (coefficients) in a color signal which is output from a defined PCS space to a certain second device (an output device)).

First Exemplary Embodiment

Figure 1:
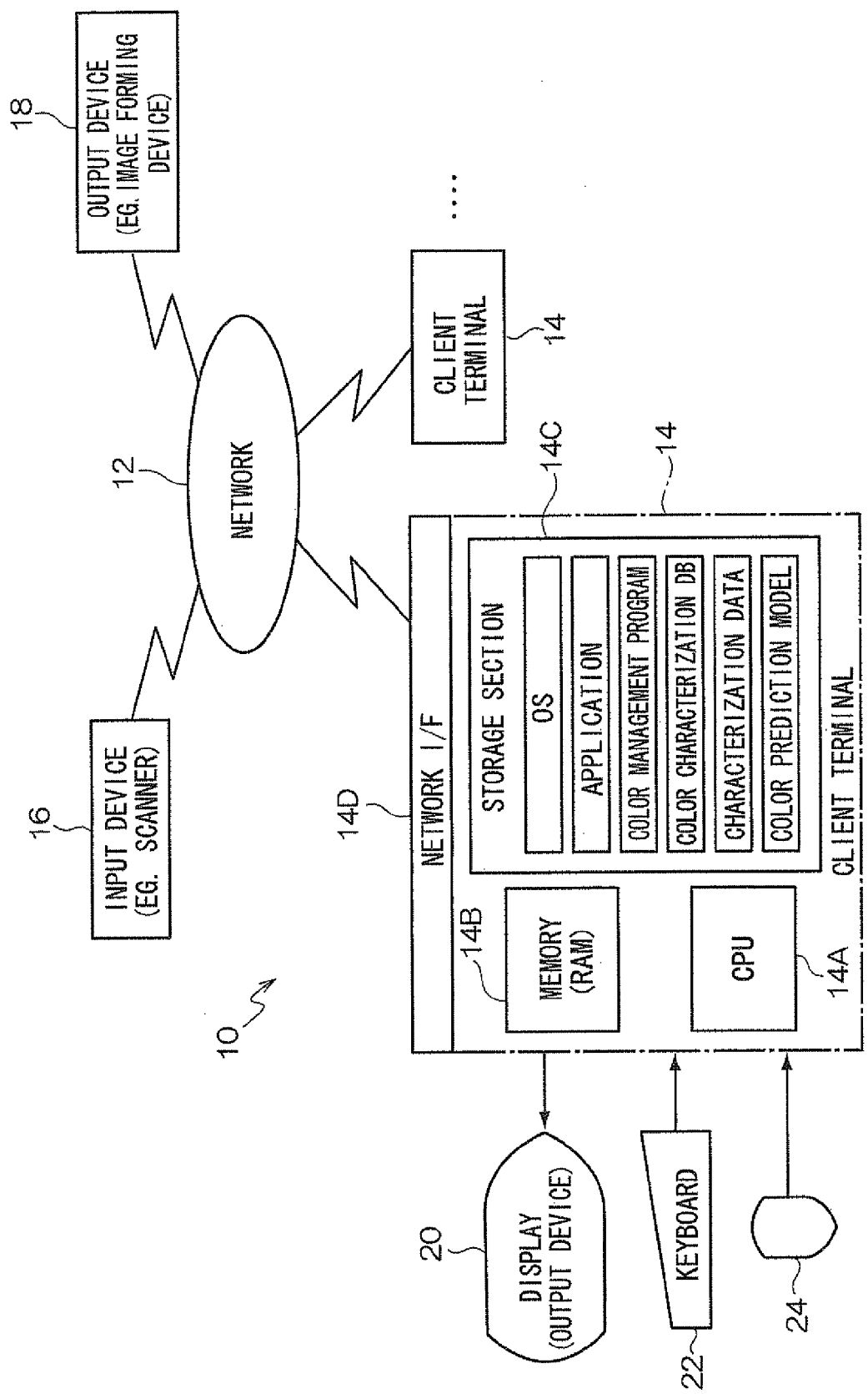
FIG. 1 is a block diagram showing a structural outline of a computer system of an exemplary embodiment.

FIG. 1 shows a structural outline of a computer system 10 according to the present exemplary embodiment. The computer system 10 is configured that plural client terminals 14 such as a PC (a personal computer), an input device 16 for inputting image (data) in the computer system 10, and an output device 18 for receiving the image data from the computer system 10 and visualizing the image data as an image are connected to a network 12 such as LAN. The input device 16 is, for example, a scanner for scanning a document to output image data. The output device 18 is, for example, an image forming device for printing image of input image data on a paper sheet (a printer or a complex machine which is a printer having additional functions of a copy machine and a facsimile machine). The network 12 may be connected to a computer network such as Internet.

Each client terminal 14 connected to the network 12 has a CPU 14A, a memory 14B including a RAM or the like, an nonvolatile storage section 14C including a HDD (Hard Disk Drive), a flash memory or the like, and a network interface (I/F) section 14D which is used to connect the client terminal to the network 12 via the network I/F section 14D. Besides, a display 20 as an output device, a key board 22 and a mouse 24 as input units are connected to the client terminal 14. The input device 16 such as a scanner and the output device 18 such as image forming device may be directly connected to the client terminal 14, like the display 20. For example, the input devices 16 may include, other than a scanner, a digital still camera and the like which are directly connected to the client terminal 14.

In addition, in the storage section 14C of the client terminal 14, an OS (Operating System) program, various application programs which operates on the OS for using the input devices 16 and output devices 18, and color management programs which performs color management described below by the client terminal 14 are installed in advance. Also, color characterization DB (database) which registers color profiles used in color management, a color prediction model program and characterizations data are stored.

Next description is made about an operation of this exemplary embodiment. The client terminal 14 in this exemplary embodiment is provided with a color management section shown in FIG. 2 in order to perform color management of correcting color appearance difference of an captured image or a reproduction image on a different device when an image data input from a certain input device 16 or an image data which is used for outputting an image in an output device 18 is used for outputting an image in another device (an output device 8).

Figure 2:
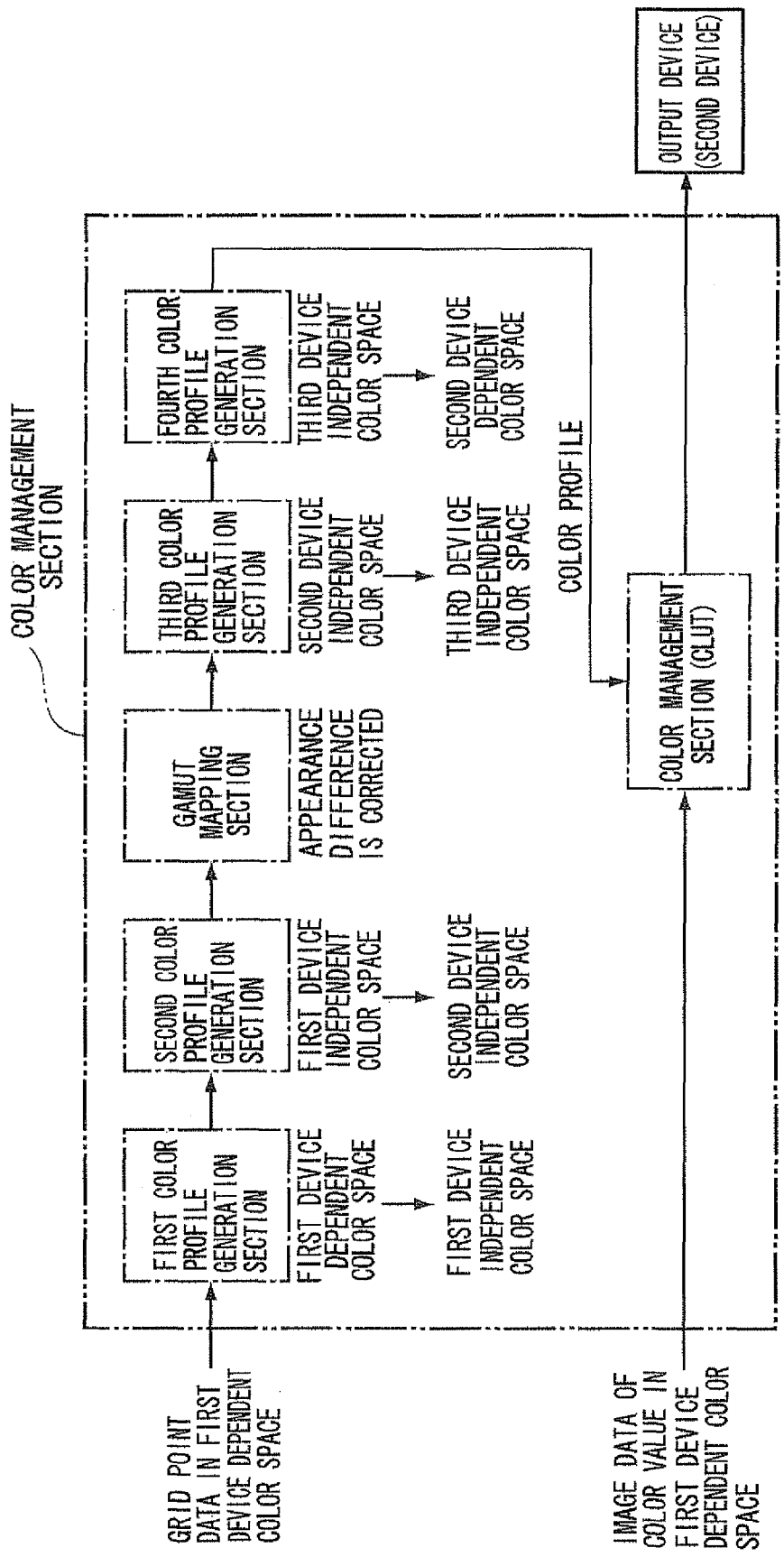
FIG. 2 is a view schematically showing a flow of color management in the exemplary embodiment.

As shown in FIG. 2, the color management section of this exemplary embodiment has a first color profile generation section which generates a first color profile by a first color conversion, a second color profile generation section which generates a second color profile from the first color profile by a second color conversion, a gamut mapping section which generates a third color profiles from the second color profile by a gamut mapping, a third color profile generation section which generates a fourth color profile from the third color profile by a third color conversion, a fourth color profile generation section which generates a fifth color profile from the fourth color profile by a fourth color conversion, and a color management section which performs color management on input image data.

The color management section has a CLUT (a color look up table). Image data of colors of pixels expressed by color in a color space dependent on a certain first device (a first device dependent color space) as image data which is a color management target is into the color management section. The image data of the color management target is input from a first device to the client terminal 14. For example, when the first device is a scanner, digital camera, display 20 or the like, the image data of respective pixel colors expressed by color values in the RGB color space as the first device dependent color space is input as the image data of the color management target. In the CLUT of the color management section, the profile for realizing the first coler conversion, second color conversion, gamut mapping, third color conversion and fourth color conversion is set as a single conversion. As the image data which is input in accordance with the color profile (CLUT) is converted, the aforementioned color management is realized.

The following description is made about each of the management. The first color conversion of this exemplary embodiment is a color conversion which converts the first device dependent color into color in a color space independent on a certain device (a first device independent color space). The first device independent color space is preferably a CIELAB color space or a CIEXYZ color space, for example. Color of each of a large number of grid points which are set in the first device dependent color space (the first device dependent color) are input as grid point data into the first color profile generation section. The first color profile generation section converts the color of each of the grid points expressed by the input grid point data (the first device dependent color) into color in the first device independent color space thereby to generate a color profile for a first color conversion. The color profile for the first color conversion means a profile which converts input values into output values, in which the input values are color of the grid points in the first device dependent color space which are input to the first color profile generation section, and the output values are color profile which is obtained by the conversion (the color of the grid points in the first device independent color space).

The second color conversion of this exemplary embodiment is a color conversion which converts the color after the first color conversion in the first device independent color space into color suitable for a gamut mapping which is independent on any certain device (a second device independent color space). The second device independent color space is preferably a color space presenting color appearance from affections by an observation condition, for example, as a color appearance model, a color space JCh defined by CIECAM02 or a color space Jab obtained by the color space JCh. Color attributes a and b of the color space Jab correspond to ac, bc generated from color attributes C, h of the color space JCh, and these color spaces have mutually exchangeable characteristics of hue and saturation. The color appearance model CIECAM02 may be replaced with a color appearance model CIECAM97s or the like.

The color profile output from the first color profile generation section (the color of the grid points in the first device independent color space) is input into the second color profile generation section. The second color profile generation section generates profile in the second color conversion by converting the input color (the color of the grid points in the first device independent color space) into color in a second device independent color space. Here, the color profile of second color conversion means a profile which converts input values into output values, in which the input values are color of grid points in the first device independent color space which is input into the second color profile generation section and the output values are color profile which is obtained by the conversion (color of the grid points in the second device independent color space).

In a gamut mapping of this exemplary embodiment, an appearance difference between devices (appearance differences which results from a difference between respective device color reproduction areas) is corrected and the color after the second color conversion are converted such that color in the second device independent color space are placed within a color reproduction area of the second device independent color space. The color profile which is output from the second color profile generation section (color the grid points in the second device independent color space) is input into a gamut mapping section. The gamut mapping section converts the input color (the color of the grid points in the second device independent color space) into new color in the second device independent color space in accordance with a given conversion rule. Here, the gamut mapping means a mapping which converts the input values to output values, in which the input values are color profile which is input to the gamut mapping section and the output values are the new color which are obtained by the conversion (the new color of the grid points in the second device independent color space).

The third color conversion according to the present exemplary embodiment is a color conversion which converts the color after the gamut mapping in the second device independent color space into color in another color space independent from a specific device (the third device independent color space. For example, CIELAB color space). The color profile which is output from the gamut mapping section (the color of the grid points in the second device independent color space) is input to a third color profile generation section. The third color profile generation section converts the input color profile (the color of the grid points in the second device independent color space) into color in a third device independent color space thereby to generate a profile for a third color conversion. Here, the color profile for the third color conversion means a conversion which converts input values into output values, in which the input values are the color profile which are input to the third color profile generation section and the output values are the color profile obtained by the conversion (the color of the grid points in the third device independent color space).

The fourth color conversion according to the present exemplary embodiment is a color conversion which converts the color after the third color conversion in the third device independent color space into color in a color space (a second device dependent color space) which is dependent on the output device (a second device). For example, CMYK color space when the output device is an image forming device. The color profile which is output from the third color profile generation section (the grid points in the third device independent color space) is input to a fourth color profile generation section. The fourth color profile generation section converts the input color profile (the colors of the grid points in the third device independent color space) into a second device dependent color thereby to generate a color profile for a fourth color conversion. Here, the color cprofile for the fourth color conversion means a profile which converts input values into output values, in which the input values are the color profile which is input to the fourth color characterization generation section and the output values are the color obtained by the conversion (the colors of the grid points in the second device dependent color space).

In the CLUT of the color management section, the colors of the grid point expressed by the aforementioned grid point data (the first device dependent color) are set as input values for defining the profile of the color management by the CLUT, and the color profile (the colors of the grid points in the second device dependent color space) which is output from the fourth color profile generation section after being subjected to the processing in the first color profile generation section, the second color profile generation section, the gamut mapping section, the third color cprofile generation section and the fourth color profile generation section. The color management section converts the input image data (image data of colors of pixels expressed by the first device dependent color) in accordance with the CLUT. Through this conversion, the input image data are converted into the image data of colors of pixels expressed by the color in the second device dependent color space, and the converted image data are output to the output device and provided for outputting an image at the output device. Accordingly, a color appearance of an image which is output from the output device may match with a color appearance of another device.

The color management program installed in the storage section 14C of the client terminal 14 includes plural programs which realizes each of the function block of the above-described color management sections (a first color profile generation program functioning as the first color profile generation section, a second color profile generation program functioning as the second color profile generation section, a gamut mapping program functioning as the gamut mapping section, a third color profile generation program functioning as the third color profile generation section, and a forth color profile generation program functioning as the forth color profile generation section). FIG. 1 shows the color management program separate from the OS program, however, the color management program may be included in an OS program as an OS standard program. Note that the color management program corresponds to a program which causes a computer to execute a color management.

The next description is made about details of generation of the color profile (color conversion coefficients) of the fourth color conversion by the fourth color profile generation section. For example, the color conversion coefficients in the form of ICC profile provided by various manufacturers and organizations may be used as the color profile (color conversion coefficients) in the fifth color profile of the fourth color conversion according to the present exemplary embodiment. For a color conversion with higher accuracy, as the pre processing or post processing of the coler conversion as described above, a one-dimensional color characterization based on a tone table or a gamma curve may be added. The above-mentioned color conversion and the pre or post processing may be integrated into a single color conversion which is to be used in the fourth color conversion. Preferably a color prediction model is used to generate the color profile (the color characterization coefficients). Also in the fourth color profile generation section according to the present exemplary embodiment, the color profile of fourth color conversion (color characterization coefficients/profile) is generated using the color prediction model. The color prediction model is a program which, based on characterizations data (also called as data set) expressing correspondence between a small number of input color and a small number of output color, when input color values of which corresponding output color values are unknown are input, outputs the corresponding output color values by estimation-calculation by various algorithms.

The color prediction model predicts and estimates color profile between a device dependent color space and a device independent color space and it generally has a smoothing function, a interpolating function which is more excellent than a linear operation (a linear interpolation), which is resistant to measurement error, device noise and in-plane unevenness. The color prediction model includes a method using statistic means (Makoto Sasaki and Hiroaki Ikegami, Proc. of International Congress of Imaging Science 2002 (2002) p. 413-141), a method using neutral net and a method using a physical model such as Neugebauer, Kubelka-Munk as a basis. As the color prediction model, there are a model for predicting/estimating color characteristics for forward color conversion (color characterization from a device dependent color to a device independent color), a model for predicting/estimating color characteristics for backward color conversion (color characterization from a device independent color to a device dependent color), and a model for predicting/estimating color characteristics of forward and backward color conversion. In any of them, characterizations data (a data set) is used as a basis to predict/estimate color characteristics.

Figure 3:
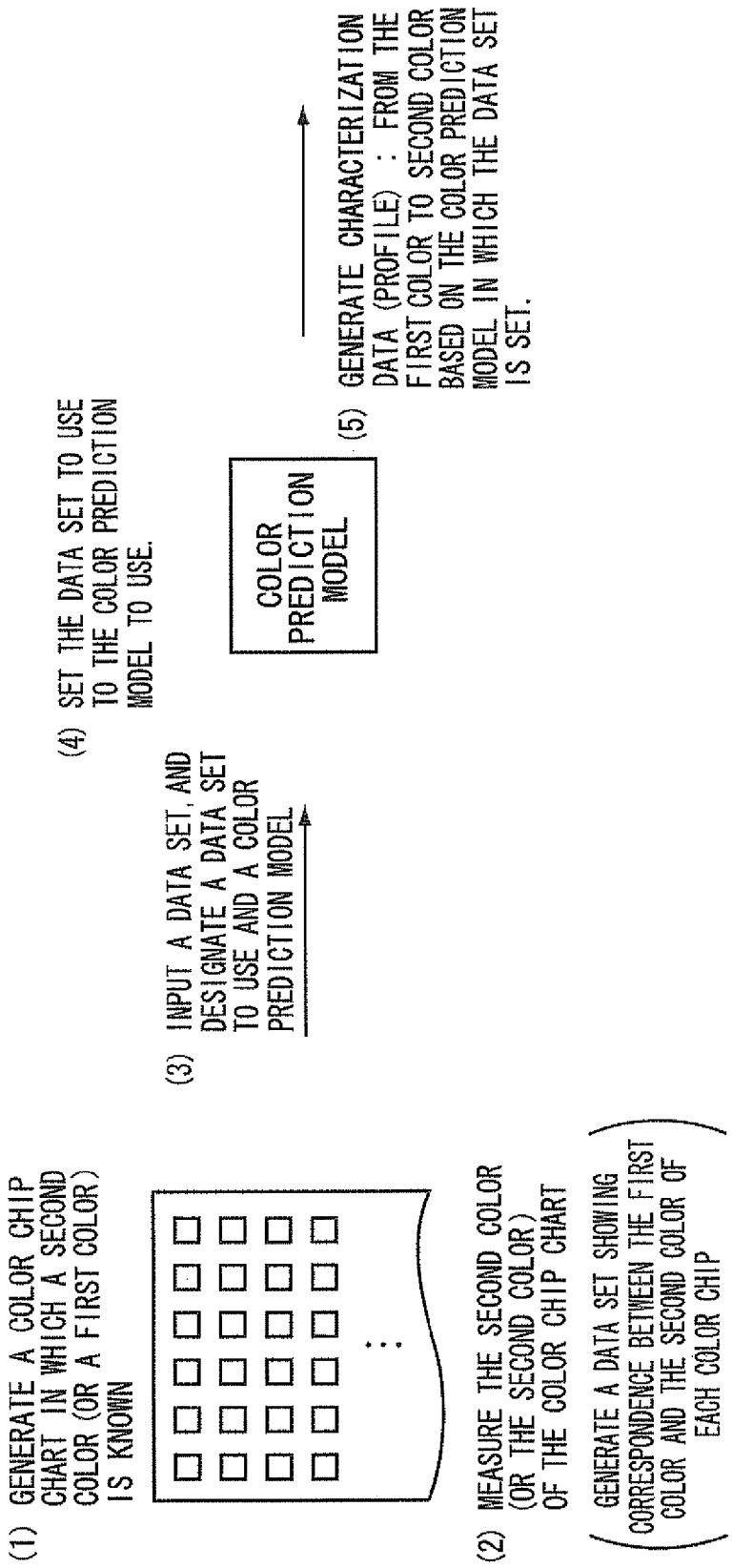
FIG. 3 is a view schematically a flow of color profile generation in a fourth color profile.

As a data set used in generating of a color profile by a color prediction model is, specifically, as shown in (1) of FIG. 3, patches (color chips) of colors of which input color (a device dependent color) are known are generated. For example, when a fifth color profile for outputting image data into an image forming device as an output device, generation of the patches is performed by printing the patches of which the input colors are known by a printer. Then, the output colors (a device dependent color) are measured by a photometer or the like for generated patches to generate characterizations data (a data set) which associates the input colors of the patches with the output colors (refer to (2) of FIG. 3). Processing in which the color profiles which are input from the third color profile generation section (the colors of the grid points in the third device independent color space) are sequentially input in the color prediction model in which the characterizations data is set. The colors which are sequentially output from the color prediction model (a device dependent color) are used as the color profile (colors of grid points in a device dependent color space) (see (5) of FIG. 3).

When the output device is an image forming device (for example, a printer), a color reproduction area in an image which is formed by the image forming device becomes relatively narrow as it is affected by limiting a color range which is able to be displayed by the C, M, Y, K toners used in image forming by the image forming device. However, a lightness of a white point of a recording media (a media white point) for an image forming device which records an image (a base part where toners are not transferred) is lower than the maximum lightness of input colors into the image forming device (the standard maximum lightness under in the RGB color space that is the first device dependent color space). For example, when the maximum lightness in the RGB color space is 100, the lightness of the white point of the recording paper ranges about from 80 to 95 though it depends on a type of the paper. The color reproduction area of the image formed by the image forming device becomes further narrower as the lightness of the white point of the recording paper is the largest saturation value. Besides, there is a recording paper sheets in which a white point (a base part) is not white but really colorized (for example, white with a tinge of yellow).

The effects of lightness and color tone of a white point of a recording paper sheet as mentioned above may be corrected by a gamut mapping. However, the lightness and the color tone of the white point of the recording paper depend on kinds of the recording paper, and the effects by the lightness and the color tone of the white point of the recording paper also depends on kinds of the recording paper. If the lightness and the color tone of the white point of the recording paper are tried to be corrected, it becomes necessary to prepare an exchange condition of a gamut mapping for a kind of a recording paper, and a gamut mapping is complicated. For this reason, the effects of the lightness and the color tone of the white point of the recording paper is often corrected in a color profile for obtaining a color which is to be input to the image forming device (the fifth color profile of the fourth color conversion in this exemplary embodiment).

In a conventional correction, a normalization is carried out in which a value which is multiplied by a color of a white point of a standard light source by a given coefficient or a color of a white point of a recording paper or the like is used as a reference color, and in color conversion, colors of a color group of a color conversion target are multiplied by correction coefficients which corresponds to a ratio of colors to the reference color to be normalized. Thus, it is a correction for matching a white point in a color group of a color conversion target with the maximum color in a color space of the color group. Lightness of a color recorded in the recording paper after normalization and the color conversion largely changes. Besides, in a conventional correction, when a color of a colorized white point in a recording paper is used as a reference color, a color group of a color conversion target becomes a color which has a constant color like the white point of the recording paper.

Figure 4:
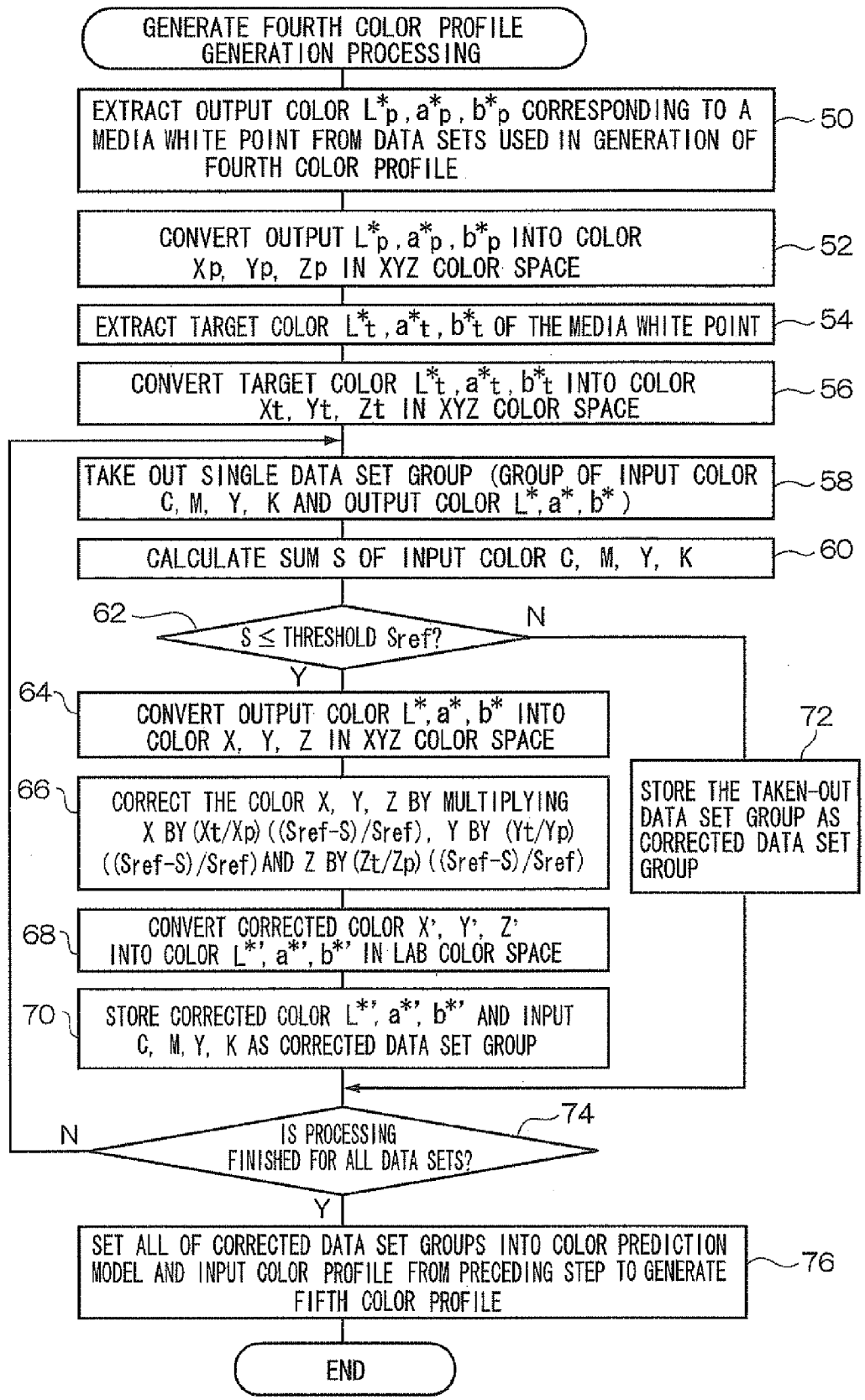
FIG. 4 is a flowchart showing a fourth color profile generation processing according to a first exemplary embodiment.

For this reason, in the first exemplary embodiment, the fifth color profile is generated after the input color group which configures a data set used in generating of the fifth color profile is changed such that the maximum lightness of the input color group of the data set matches with a preset target lightness of the white point in generating of the fifth color profile. In the following, the fourth color profile generation processing according to this first exemplary embodiment is explained with reference to FIG. 4. This fourth color profile generation processing is processing which corresponds to the fourth color profile generation section and which is realized by executing the fourth color profile generation program by the CPU 14A of the client terminal 14.

When the fourth color profile generation processing is performed, the data set which is generated after the above-described steps (1) to (3) in FIG. 3 is stored in the storage section 14C. In the step 50, this data set is read out from the storage section 14C and stored in the memory 14B, and output color $L^*p$, $a^*p$ and $b^*p$ which correspond to a media white point (for example, output color values which corresponds to input color values C=M=Y=K=0) are extracted from the data set stored in the memory 14B. In the step 52, the output color $L^*p$, $a^*p$ and $b^*p$ obtained in the step 50 are substituted into a predetermined conversion expression for calculation such that the output color $L^*p$, $a^*p$ and $b^*p$ are converted into color values Xp, Yp and Zp in the XYZ color space.

In the step 54, the target color $L^*t$, $a^*t$ and $b^*t$ of the white point which is set in advance and stored in the storage section 14C are read out from the storage section 14C. As the target color $L^*t$, $a^*t$ and $b^*t$ of the white point, values of which lightness is higher by a predetermined value than that of the media white point may be used if a kind of the paper sheet used in printing by the image forming device, for example, (CIELAB of the media white point) is known. If the kind of the paper sheet used in printing of the image forming device is not known, color in which lightness is higher by a predetermined value than the lightness of the white point in a general paper (for example, L*=80 to 95) may be used or values obtained by multiplying each of XYZ values of the white point of a standard light source (for example, a D50 light source or D65 light source) in the CIEXYZ color space by 0.89. The step 54 corresponds to "an obtaining unit". In the step 56, the target colors $L^*t$, $a^*t$ and $b^*t$ are converted into colors Xt, Yt and Zt in the CIEXYZ color space by substituting the target colors $L^*t$, $a^*t$ and $b^*t$ which are read out in the step 54 into a predetermined color characterization expression.

The following steps 58 to 74 correspond to "a change unit". In the step 58, a single data set (set of input colors C, M, Y, K and output colors $L^*$, $a^*$, $b^*$) which is a target for a processing is extracted from the data sets stored in the memory 14B in the preceding step 50. In the step 60, a sum S (=C+M+Y+K) are calculated for the input values which are extracted in step 50. In the step 62, it is determined whether or not the sum S obtained in the step 60 is equal to a predetermined threshold value Sref or less. If the determination is negative, it is able to judge that data set (input color thereof) which is a processing target has lightness which is much different from the lightness of the white point. Then, the process goes to the step 72. The data set which is a processing target extracted in the step 58 is stored in the storage section 14C as a corrected characterization data set.

Meanwhile, if the determination is affirmative in step 62, the data set (the input color thereof) which is a processing target has lightness which is closer to that of the white point. Then, the process goes to the step 64. The output colors $L^*$, $a^*$, $b^*$ are converted into the color values X, Y, Z in the CIEXYZ color space by substituting the output color $L^*$, $a^*$, $b^*$ in the data set which is a processing target extracted in the step 58 into a predetermined color conversion expression. In the step 66, the color value X among the color values X, Y, Z obtained after calculation in the step 64 is substituted into the following expression (1), the color value Y is substituted into the following expression (2) and the color value Z is substituted into the following expression (3) thereby to calculate color values X', Y', Z' from the color values X, Y, Z.

$$X' \leftarrow X \cdot (Xt/Xp) \cdot ((Sref-S)/Sref) \quad (1)$$

$$Y' \leftarrow Y \cdot (Yt/Yp) \cdot ((Sref-S)/Sref) \quad (2)$$

$$Z' \leftarrow Z \cdot (Zt/Zp) \cdot ((Sref-S)/Sref) \quad (3)$$

Among the coefficients for multiplying the color value X in the above-mentioned expression (1), (Xt/Xp) corresponds to "a correction coefficient", and ((Sref−S)/Sref) corresponds to "a change ratio". Likewise, in the expression (2), among the coefficients for multiplying the color value Y, (Yt/Yp) corresponds to "a correction coefficient", and ((Sref−S)/Sref) corresponds to "a change ratio". Also in the expression (3), among the coefficients for multiplying the color value Z, (Zt/Zp) corresponds to "a correction coefficient", and ((Sref−S)/Sref) corresponds to "a change ratio".

When the correction calculations of the above-mentioned expressions (1) to (3) are performed on the colors X, Y, Z which correspond to the output colors L, A, B, the corrected colors X', Y', Z' are changed into colors in which the maximum lightness is equivalent to a lightness of target colors L*t, a*t, b*t. Besides, if the media white point is not white (the output colors L*p, a*p, b*p which corresponds to the media white point represent a color which is not white), the corrected color values X', Y' and Z' do not present a color which is colorized in a similar manner as the white point. As to data set of which the sum S is greater than the threshold Sref, lightness is maintained by not performing above-mentioned correction operations of the expressions (1) to (3). On the other hand, as to the data set of which the sum S is less than or equal to the threshold Sref, an amount of a change of a lightness is increased as a deviation of the sum S from the threshold Sref is larger.

In the step 68, the colors X', Y', Z' obtained after the correction in the step 66 are substituted into predetermined color conversion expressions and calculated thereby to convert the corrected colors X', Y', Z' after the correction into corrected colors L*', a*', b*' in the CIELAB color space. In the step 70, the corrected colors L', A', B' obtained in the above-mentioned steps 64 to 70 are associated with the input colors C, M, Y, K out of a single data set which is the processing target extracted in the step 58 and stored in the memory 14B as corrected characterization data set.

In the step 74, it is determined whether or not all of the characterization data sets stored in the memory 14B in the preceding step 50 are extracted as processing targets. If the determination is negative, the process goes back to the step 58, and the steps 58 through 74 are repeated until the determination in the step 74 is affirmative. With this process, among the characterization data sets stored in the memory 14B in the preceding step 50, a characterization data set of which the sum S for the input colors C, M, Y, K is greater than the threshold Sref is stored in the memory 14B as corrected characterization data set. For characterization data sets of which the sum S as to the input colors C, M, Y, K is equal to or less than the threshold Sref, they are stored in the memory 14B as corrected data sets after corrections of the expressions (1) to (3) are performed on the output colors.

When the determination in the step 74 is affirmative, the process goes to the step 76. The program of the color prediction model is read out from the storage section 14C and stored in the memory 14B. Among all corrected characterization data sets stored in the memory 14B in the step 70 or 72, corrected colors L*', a*', b*' are set as output color of a characterization data set and input colors C, M, Y, K are set as input color of the characterization data set in the program of the color prediction mode. Then, the color profile which is input from the third color profile generation section to the fourth color profile generation section are read out from the storage section 14C and stored in the memory 14B and after that the color prediction model program is executed. Then, the color profile stored in the memory 14B (colors of the grid points in the third device independent color space) are sent to the program of the color prediction model, By the color prediction model program based on relationships between the output colors and the input values of the preset characterization data set and the color profile are calculated in accordance with a predetermined algorithm and outputted. Then, the color profile which are output from the color prediction model (the colors C, M, Y, K of the grid points in the CMYK color space) are stored as the color profile and the fourth color profile generation processing is ended. The step 76 corresponds to "a generation unit".

When color of image data expressed by the colors in the first device dependent are input to the CLUT of the coler management section, an integrated conversion of the first coler conversion, the second color conversion, the gamut mapping, the third color conversion and the fourth color conversion is performed thereby the input colors are converted into the output colors C, M, Y, K in the CMYK color space as the second device dependent color space and outputted.

Second Exemplary Embodiment

Next description is made about the second exemplary embodiment of the present invention. Here, this second exemplary embodiment has the same structure as that of the first exemplary embodiment, the same reference numerals are added to the same components and explanations thereof are omitted. In the following description, the operation of the second exemplary embodiment is explained.

Figure 5:
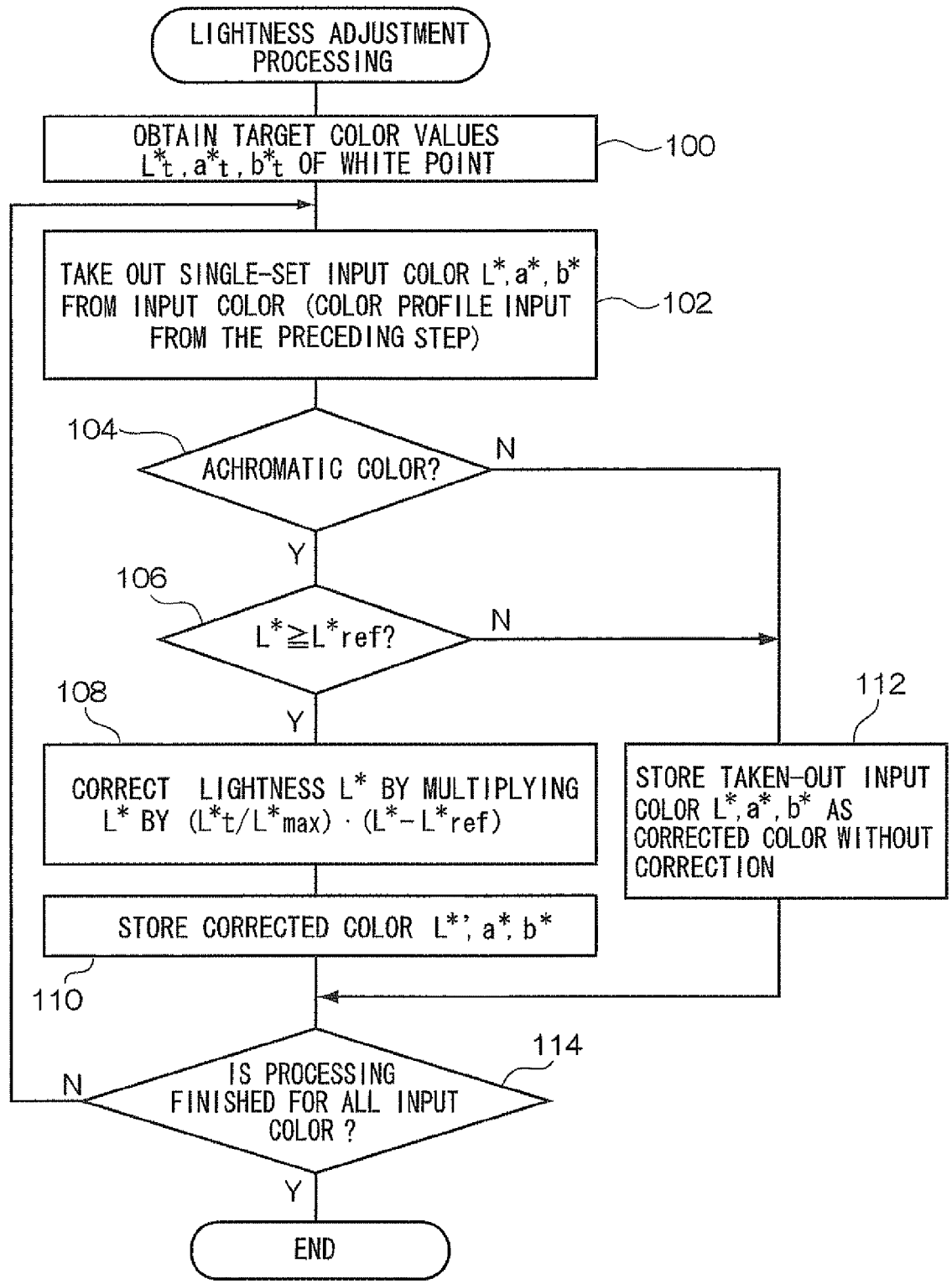
FIG. 5 is a flowchart showing lightness adjustment processing according to a second exemplary embodiment.

In the second exemplary embodiment, in addition to the fourth color profile generation processing (FIG. 4) explained in the first exemplary embodiment, lightness adjustment processing shown in FIG. 5 is performed prior to performing of the fourth color profile generation processing, unlike in the first exemplary embodiment. The execution timing of the lightness adjustment processing according to the second exemplary embodiment is preferably prior to execution of the fourth color profile generation processing, and it may be any timing of, for example, immediately before generating of the second color profile, immediately before generating profile by the gamut mapping, immediately before generating of the fourth color profile or immediately before generating of the fifth color profile.

In the lightness adjustment processing, the lightness adjustment is performed on the color profile generated in the preceding profile generation processing. The color profile which is to be lightness-adjusted varies depending on the execution timing of the lightness adjustment processing. When the lightness adjustment processing is executed immediately before generation of the second color profile, the lightness adjustment is performed on the color profile which is output from the first color profile generation section (the first device independent color). When the lightness adjustment processing is executed immediately before generation by the gamut mapping, the lightness adjustment is performed on the color profile which is output from the second color profile generation section (the second device independent color). When the lightness adjustment processing is executed immediately before generation the fourth color profile, the lightness adjustment is performed on the color profile which is output from the gamut mapping generation section (the second device independent color). When the lightness adjustment processing is executed immediately before generation of the fifth color profile, the lightness adjustment is performed on the color profile which is output from the third color profile generation section (the third device independent color). In the following description, the color profile which is lightness adjustment target are colors in the CIELAB color space, however the color profile which is lightness adjustment target may be colors in another color space.

As shown in FIG. 5, in the lightness adjustment processing according to the second exemplary embodiment, in the step 100, the target colors L*t, a*t, b*t of the white point are obtained which are also used in the forth color profile generation processing explained in the first exemplary embodiment. In the step 102, the color profile (the input colors) stored in the storage section 14C which are output from the preceding profile generation section are read out from the storage 14C and stored in the memory 14B, and then, a single set of input colors L*, a*, b* are extracted as a processing target from the input colors stored in the memory 14B.

In the step 104, it is determined whether or not input colors extracted in the step 102 are colors representing an achromatic color. When the input colors are colors in the CIELAB color space, determination whether or not the input colors represent an achromatic color is performed by determining whether a*=b*=0 or not. The step 104 corresponds to "a determination unit". When the determination in the step 104 is affirmative, the process goes to the step 106. It is determined whether or not a lightness L* of the input colors extracted in the step 102 equal to a reference lightness L*ref or more. When the determination in the step 104 or 106 is negative, the process goes to the step 112. The input colors L*, a*, b* extracted in the step 102 are stored as they are in the memory 14B as corrected colors.

On the other hand, if the determinations in the steps 104, 106 are both affirmative, the process goes to the step 108. The lightness L* of the input colors extracted in the step 102 is substituted into the following expression (4) to correct (adjust) the lightness L* to the lightness L'.

$$L^{*\prime} \leftarrow L^* \cdot (L^*t/L^*\mathrm{max}) \cdot (L^* - L^*\mathrm{ref}) \quad (4)$$

L*max in the expression (4) is the maximum lightness (L*=100) in the color profile of the lightness adjustment target. In the profile for multiplying the lightness L* in the above-mentioned expression (4), (L*t/L*max) corresponds to "a ratio of the lightness of the white point of the color group to the target lightness of the white point". (L*−L*ref) corresponds to "a difference between the lightness of the color and the minimum lightness in the specific lightness range". In the step 110, the corrected lightness L*' obtained from the calculation of the expression (4) is stored in the memory 14B as the corrected color together with the colors a*, b* among the input L*, a*, b* extracted in the step 102. The above-mentioned steps 106 through 112 correspond to "a lightness adjustment unit".

In the next step 114, it is determined whether or not processing is ended for all of the input colors. If the determination is negative, the process goes back to the step 102, and the steps 102 through 114 are repeated until the determination of the step 114 is affirmative. When the determination in the step 114 is affirmative, the lightness adjustment processing is ended. The corrected colors stored in the memory 14B by this lightness adjustment processing are used in the next generation of the color profile.

In the lightness adjustment processing described above, the lightness L* is corrected (adjusted) in accordance with the expression (4) only for the input colors (the input colors of which determinations in the steps 104 and 106 both are affirmative) which represents an achromatic color and of which the lightness L* is equal to the reference lightness L*ref or more among the input colors (the color profile which is output from the preceding profile generation section). Lightness of input colors representing a chromatic color and input colors of which the lightness L* is less than the reference lightness L*ref are stored. On the other hand, as to the input colors which represent an achromatic color and of which the lightness L* is equal to the reference lightness L*ref or more, the lightness L* is corrected (adjusted) such that the target lightness L*t is the maximum lightness with a change amount of the lightness which increases as a difference between the lightness L* and the reference lightness L*ref is larger.

Figure 6:
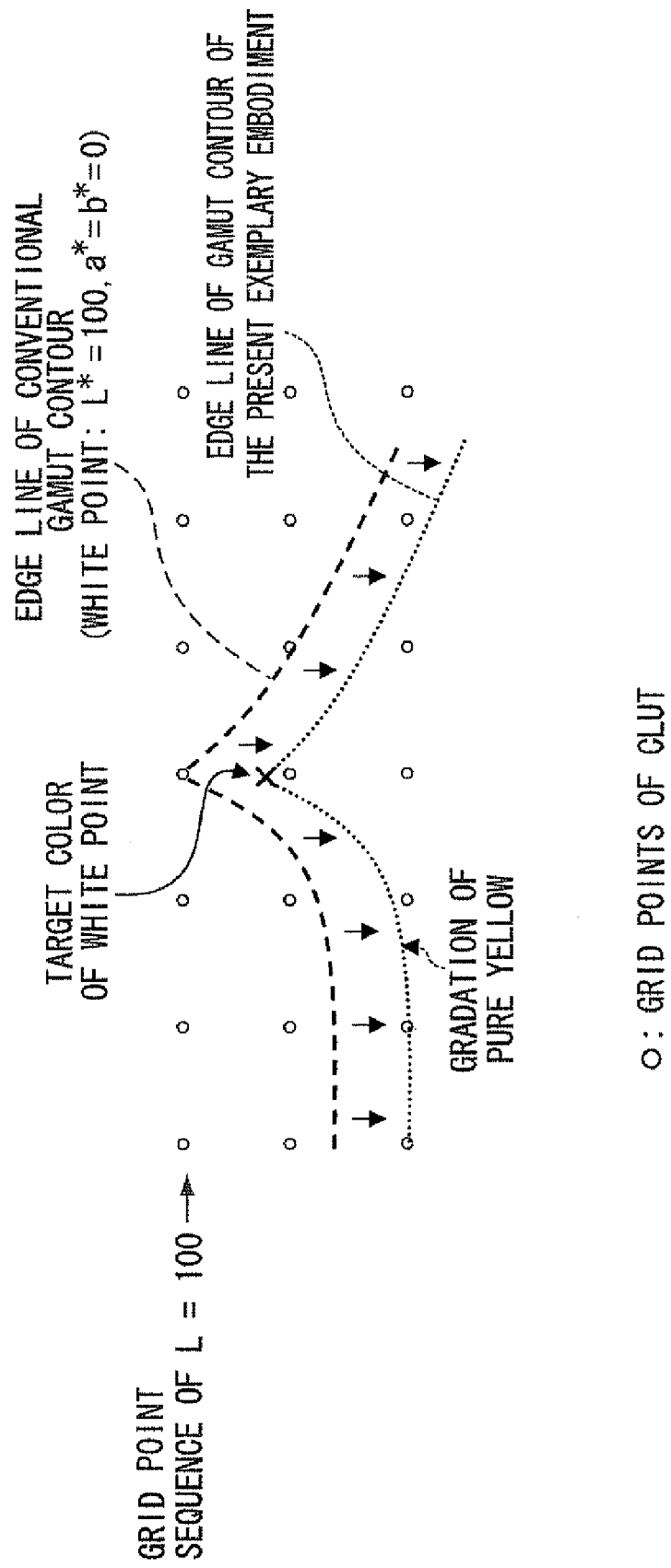
FIG. 6 is a conceptual view for explaining relationships between an edge line of a gamut and grid points of a CLUT which vary depending on target values of a white point.

In addition, in this exemplary embodiment, for example, as shown in FIG. 6, the target colors of the white point (particularly, the target lightness L*t) are adjusted in advance so as to be equivalent to values which placed between the grid points of the CLUT. In this exemplary embodiment, the above-described lightness adjustment processing and the fourth color profile generation processing are performed such that an edge line of a gamut moves to a position in which the target lightness L*t of the white point is the reference. When the target lightness L*t of the white point is adjusted to correspond to a value in the grid points of the CLUT, as the pure yellow has lightness which is close to that of the white point, a gradation distribution of pure yellow is made closer to a position of the grid points of the CLUT. As such, in color characterization using the CLUT, output colors of colors for forming pure yellow tone are determined based on information of a single CLUT grid point or plural grid points which are fewer than that in an conventional example. This exemplary embodiment corresponds to "a color look-up table".

In the above exemplary embodiments, the present invention is applied to generating of a color profile for converting an output color (color values L*, a*, b*) from an image forming device as a certain device into an input color (color values C, M, Y, K) to an image forming device as another device. However, the present invention is not limited to this and may be applied to generating of a color profile for converting the input color into the output color.

In the above description, the image forming device (a printer) has been described as an example of a certain device of this invention, however the present invention is not limited to this. For example, the present invention is applicable to any device such as an image display device or the like. In the above-described exemplary embodiment, it is assumed that the device dependent color space is the CMYK color space and the device independent color space is the CIELAB color space. However, these color spaces may be changed depending on the kind of the device appropriately.

In the above-described exemplary embodiment, it is assumed that the color management program for corresponding to the color management program according to this invention is stored (installed) in advance in the storage section 14C of the client terminal 14. However, the color management program of this invention may be embodied as stored in a computer readable medium such as CD-ROM, DVD-ROM or the like.

The foregoing description of the embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to are suited to the particular use contemplated. It is intended that the scope of the invention be defined by the following claims and their equivalents.

What is claimed is:

1. A color management apparatus that executes color management between an input color and an output color of a device, comprising:
  a generation unit that generates a color profile between the input color which is input into the device and the output color which is output from the device, using a color prediction model, data of the input color expressed by a device dependent color space, and data of the output color expressed by a device independent color space;
  an obtaining unit that obtains a target lightness of a white point which is less than a standard maximum lightness in the device independent color space; and
  a change unit that changes the output color to a device independent color having a maximum lightness of the device independent color space being set to the target lightness of the white point obtained by the obtaining unit.

2. The color management apparatus of claim 1, wherein
  the device is a printer which prints a color on a media based on the data of the input color; and
  the target lightness of the white point is a lightness of a media white point or a lightness which is higher by a predetermined value than the lightness of the media white point.

3. The color management apparatus of claim 1, wherein the target lightness of the white point is a value obtained by multiplying each of X, Y and Z values of a white point of a standard light source in a CIEXYZ color space by 0.89.

4. The color management apparatus of claim 1, wherein
  the device is a printer which prints a color on a media based on the data of the input color; and
  the change unit obtains a lightness of a media white point on which the color is to be printed by the printer, and changes the output color by multiplying the output color by a correction coefficient obtained by dividing the target lightness of the white point obtained by the obtaining unit by the obtained lightness of the media white point.

5. The color management apparatus of claim 1, wherein
  the obtaining unit obtains a target color of the white point having a lightness less than the standard maximum lightness in the device independent color space, and
  the change unit changes the output color such that a color value corresponding to a white point in the output color matches the target color.

6. The color management apparatus of claim 5, wherein
  the device is a printer which prints a color on a media based on the data of the input color; and
  the target lightness of the white point is a lightness of a media white point or a lightness which is higher by a predetermined value than the lightness of the media white point, and the target color of the white point is a color corresponding to the lightness of the media white point or a color corresponding to a lightness which is higher by a predetermined value than the lightness of the media white point.

7. The color management apparatus of claim 5, wherein the target lightness or the target color of the white point is a value which is obtained by multiplying X, Y and Z values of a white point of a standard light source in a CIEXYZ color space by 0.89.

8. The color management apparatus of claim 5, wherein
  the device is a printer which prints a color on a media based on the data of the input color; and
  the change unit obtains a lightness or a color of a media white point on which the color is to be printed by the printer, and changes the output color by multiplying the output color by a correction coefficient obtained by dividing the target lightness or the target color of the white point obtained by the obtaining unit by the obtained lightness of the obtained color of the media white point.

9. The color management apparatus of claim 1, wherein the change unit obtains a reference lightness of the input color, and changes an output color which corresponds to an input color with a lightness equal to or greater than the reference lightness, by a change ratio based on a ratio of the lightness of the input color to the reference lightness.

10. The color management apparatus of claim 1,
  wherein the generation unit generates the color profile in which the device independent color is converted to the device dependent color by inputting a color group in the device independent color space into the color prediction model in which the data of the input color and the data of the output color are set, and
  the color management apparatus further comprises:
  a determination unit that determines whether or not each color of the color group is achromatic; and
  a lightness adjustment unit that, before input into the color prediction model, performs lightness adjustment of the color group which is determined to be achromatic by the determining unit and which is within a specified lightness range, the lightness adjustment corresponding to changing a lightness of a white point of the color group to the target lightness of the white point.

11. The color management apparatus of claim 10, wherein the lightness adjustment unit adjusts the lightness of the color group which is determined to be achromatic and within the specified lightness range by the determination unit, by multiplying a ratio of the lightness of the white point of the color group to the target lightness of the white point with a difference between the lightness of the color and the minimum lightness in the specific lightness range.

12. The color management apparatus of claim 10, wherein in the generated color profile, output colors are multiplied by correction coefficients the products of which are conversion target colors corresponding to grid points in a color look-up table, the generated color profile is set in the color look-up table to be used in the color conversion, and the target lightness of the white point corresponds to a value between the grid points of the color look-up table.

13. A color management method comprising:
  obtaining a target lightness of a white point which is less than a standard maximum lightness in a device independent color space;
  using a color prediction model, data of an input color which is input into a device and expressed by a device dependent color which is dependent on the device, and data of an output color which is output from the device and expressed by a device independent color, changing the output color, which is used to generate a color profile between the input color and output color, to a device independent color, the maximum lightness of the device independent color space being set to the obtained target lightness of the white point; and generating the color profile using the color prediction model.

14. A non-transitory computer readable medium storing a program causing a computer to execute a color management process between an input color and an output color of a device, the color management process comprising:
  obtaining a target lightness of a white point which is less than a standard maximum lightness in a device independent color space;
  using a color prediction model, data of an input color which is input into the device and expressed by a device dependent color dependent on the device, and data of the output color which is output from the device and expressed by a device independent color, changing the output color, which is used to generate a color profile between the input color and the output color, to a device independent color, the maximum lightness of the device independent color space being set to the obtained target lightness of the white point; and
  generating the color profile using the color prediction model.

15. The non-transitory computer readable medium of claim 14, wherein
  the device is a printer which prints a color on a media based on the data of the input color; and
  the target lightness of the white point is a lightness of a media white point or a lightness which is higher by a predetermined value than the lightness of the media white point.

16. The non-transitory computer readable medium of claim 14, wherein the target lightness of the white point is a value obtained by multiplying X, Y and Z values of a white point of a standard light source in a CIEXYZ color space by 0.89.

17. The non-transitory computer readable medium of claim 14, wherein
  the device is a printer which prints a color on a media based on the data of the input color; and
  the changing includes obtaining a lightness of a media white point on which the color is to be printed by the printer, and changing the output color by multiplying the output color by a correction coefficient obtained by dividing the obtained target lightness of the white point by the obtained lightness of the media white point.

18. The non-transitory computer readable medium of claim 14, wherein the obtaining includes obtaining a target color of the white point having a lightness less than the standard maximum lightness in the device independent color space, and the changing includes changing the output color such that a color value corresponding to a white point in the output color matches the target color.

19. The non-transitory computer readable medium of claim 14, wherein the changing includes obtaining a reference lightness the input color, and changing the output color which corresponds to an input color with a lightness equal to or greater than the reference lightness, by a change ratio based on a ratio of the lightness of the input color to the reference lightness.

20. The non-transitory computer readable medium of claim 14,
  wherein the generating includes generating the color profile in which the device independent color is converted to the device dependent color by inputting a color group in the device independent color space into the color prediction model in which the data of the input color and the data of the output color are set, and
  the color management process further comprises:
  determining whether or not each color of the color group an achromatic; and
  performing lightness adjustment, before input into the color prediction model, of a color of the color group which is determined to be achromatic and which is within a specified lightness range, the lightness adjustment corresponding to changing a lightness of a white point of the color group to the target lightness of the white point.

* * * * *